(12) United States Patent
Bienek et al.

(10) Patent No.: US 9,297,194 B2
(45) Date of Patent: Mar. 29, 2016

(54) HYDRAULIC SOLENOID DISTRIBUTION VALVE

(75) Inventors: Volker Bienek, Dortmund (DE); Thomas Wildförster, Schwelm (DE)

(73) Assignee: Dorma Deutschland GmbH, Ennepetal (DE)

( * ) Notice: Subject to any disclaimer, the term of this patent is extended or adjusted under 35 U.S.C. 154(b) by 588 days.

(21) Appl. No.: 13/638,859

(22) PCT Filed: Nov. 30, 2010

(86) PCT No.: PCT/EP2010/007254
§ 371 (c)(1),
(2), (4) Date: Oct. 1, 2012

(87) PCT Pub. No.: WO2011/120546
PCT Pub. Date: Oct. 6, 2011

(65) Prior Publication Data
US 2013/0020515 A1    Jan. 24, 2013

(30) Foreign Application Priority Data
Apr. 1, 2010    (DE) .......................... 10 2010 013 853

(51) Int. Cl.
*F16K 31/06* (2006.01)
*E05F 3/22* (2006.01)

(52) U.S. Cl.
CPC .............. *E05F 3/223* (2013.01); *F16K 31/0631* (2013.01); *F16K 31/0693* (2013.01); *E05Y 2900/132* (2013.01)

(58) Field of Classification Search
CPC ........................... F16K 31/062; F16K 31/0631

USPC ............ 137/625.26, 625.27, 625.48, 625.49, 137/625.65
See application file for complete search history.

(56) References Cited

U.S. PATENT DOCUMENTS

| 2,934,090 | A | * | 4/1960 | Kenann et al. | ............. 137/625.5 |
| 3,396,751 | A | * | 8/1968 | Bender | .................... 137/625.65 |
| 3,661,183 | A | * | 5/1972 | Komaroff et al. | ........ 137/625.65 |
| 4,074,700 | A | * | 2/1978 | Engle | ....................... 137/625.65 |
| 4,611,631 | A | | 9/1986 | Kosugi et al. | |
| 5,467,797 | A | * | 11/1995 | Seetharaman et al. | ... 137/599.07 |
| 6,065,495 | A | * | 5/2000 | Fong et al. | ............... 137/625.25 |
| 6,866,063 | B2 | * | 3/2005 | Avila | ........................ 137/596.17 |
| 7,481,734 | B2 | * | 1/2009 | Morise et al. | ................. 475/119 |
| 7,921,827 | B2 | * | 4/2011 | Kobayashi et al. | ........... 123/458 |
| 7,987,871 | B2 | * | 8/2011 | Cho et al. | ................ 137/625.65 |
| 8,875,344 | B2 | * | 11/2014 | Salutzki et al. | .................... 16/53 |
| 2003/0155021 | A1 | * | 8/2003 | Boecking | ................ 137/625.65 |

FOREIGN PATENT DOCUMENTS

DE            1 256 492       12/1967

* cited by examiner

*Primary Examiner* — Craig Schneider
*Assistant Examiner* — Nicole Wentlandt
(74) *Attorney, Agent, or Firm* — Cozen O'Connor

(57) ABSTRACT

A solenoid distribution valve has a housing, a valve chamber integrated in the housing and a first valve seat bore for connection to a first line, a second valve seat bore as a connection to a second line and a clear opening to a third line, an electromagnet, and a valve lifter that can be moved by the electromagnet. A valve lifter within the valve chamber includes a first sealing surface facing the first valve seat bore and a second sealing surface facing the second valve seat bore that are optionally closable. The valve lifter extends out of the valve chamber through the second valve seat bore to the electromagnet. When the second valve seat bore is closed, the valve lifter is drawn, via a differential pressure ratio, by the pressure in the second line, into the second valve seat bore.

16 Claims, 4 Drawing Sheets

HYDRAULIC SOLENOID DISTRIBUTION VALVE

CROSS REFERENCE TO PRIORITY APPLICATIONS

This is a U.S. national stage of application No. PCT/EP2010/007254, filed on 30 Nov. 2010. Priority is claimed German Application No. 10 2010 013 853.3 filed 1 Apr. 2010, the content of which is/are incorporated here by reference.

BACKGROUND OF THE INVENTION

1. Field of the Invention

The present invention relates to a hydraulic solenoid control valve, in particular, a hydraulic 3/2-solenoid control valve embodied as a double-seated valve in a cartridge design.

2. Description of Related Art

From the state of the art, e.g. 3/2-solenoid control valves including a magnetic actuator are known. This type of hydraulic valves offers two different switching positions for three different connection lines. With the two different switching positions, e.g. a pressure line P is selectively connected to a pressure-less tank line T, or an operating line A is selectively connected to the tank line T.

SUMMARY OF THE INVENTION

It is an object of one embodiment of the invention to provide a hydraulic solenoid control valve that is very compact and operates free of leakage oil even under high pressures, while being manufactured at low costs.

A hydraulic solenoid control valve, in particular a hydraulic 3/2-solenoid control valve, comprises a valve housing, a solenoid and a valve spindle. A valve chamber is integrated into the housing. This valve chamber comprises a first valve seat bore as a connection to a first line, in particular a pressure line, a second valve seat bore as a connection to a second line, in particular an operating line, and a free aperture to a third line, in particular a tank line. The aperture is referred to as "free", since it connects the valve chamber to the third line in any switching position of the valve. The valve spindle is at least partially arranged within the valve chamber and is linearly moved by the solenoid. Further, the valve spindle comprises, within the valve chamber, a first sealing surface facing the first valve seat bore and a second sealing surface facing the second valve seat bore, such that selectively the first valve seat bore or the second valve seat bore can be closed. In addition, the valve spindle protrudes from the valve chamber through the second valve seat bore and through the second line toward the solenoid. Due to the protrusion of the valve spindle from the valve chamber, the valve spindle can be connected to the solenoid or can be partially integrated into the solenoid. In case the second valve seat bore is closed, the valve spindle is pulled into the second valve seat bore by a differential-area-ratio through the pressure of the second line, in particular the operating line. This arrangement including a differential area ratio promotes a sealing of the second valve seat bore free of leakage oil.

This differential-area-ratio is in particular achieved in that a sealing diameter of the valve spindle outside the valve chamber is larger than a diameter of the second valve seat bore. The sealing diameter is defined at a seal between the valve spindle and the solenoid.

Preferably, the differential-area-ratio is obtained by configuring the diameter of the valve spindle outside the valve chamber to be larger than the bore diameter of the second valve seat bore. Therewith, the pressure of the second line in front of the valve chamber can support the force of the pressure spring, when the second valve seat bore is closed, and pull the second sealing surface into the second valve seat bore.

Preferably, the first sealing surface comprises a convex surface, in particular a ball. Further preferably, the second sealing surface comprises a cone surface, in particular a cone ring surface. By linearly displacing or moving the valve spindle, the first valve seat bore is closed by the convex surface or the second valve seat bore is closed by the cone surface, selectively. Therewith, selectively the first line, in particular a pressure line, is connected to the third line, in particular a tank line, or the second line, in particular an operating line, is connected to the third line. A seizure in the switching position under pressure is effectively prevented by the ball valve embodiment including the convex surface.

In a preferred embodiment, a pressure spring is arranged between the first valve seat bore and the valve spindle. In the variant including a ball, the inventive valve may therefore be referred to as a spring-loaded ball-cone-seat valve.

In a further preferred embodiment, it is provided that the second sealing surface, in particular the cone surface, seals the second valve seat bore in a de-energized state of the solenoid, and that the first sealing surface, in particular the convex surface, seals the first valve seat bore in an energized state of the solenoid. The preferably provided pressure spring serves to press the second sealing surface of the valve spindle into the second valve seat bore in a de-energized state.

In a further preferred embodiment, the valve spindle comprises at least two parts. For this purpose, the valve spindle comprises a first part and a second part, wherein the first part is guided to be linearly movable in the solenoid and the second part is screwed into the first part. Consequently, the second part is fixedly connected to the first part and is linearly movable together with the first part. In particular for providing the differential-area-ratio, this two-part form of the valve spindle is especially easy to assemble. Therewith, in particular the sealing diameter can be configured to be larger than the bore diameter of the second valve seat bore.

In addition, it is preferably provided that a seal, in particular a groove ring seal, is arranged between the valve spindle and an armature space of the solenoid. Said seal is disposed at the already discussed sealing diameter between the valve spindle and the solenoid. Particularly preferred, the armature space is always freely connected to the third line, in particular the tank line, via a connection channel extending through the valve spindle. Therewith, a pressure generation in the armature space upon a possible leakage of the groove ring seal is prevented. The connection channel within the valve spindle extends from the armature space through the valve spindle into the valve chamber. As already described, the valve chamber is always freely connected to the third line, in particular the tank line.

Further, the invention preferably comprises a filter, in particular in the first line. Particularly preferred, the filter is arranged outside the valve chamber directly in front of the inlet into the first valve seat bore. The filter prevents pollution of the oil and in particular a pollution of the two valve seats.

In a further preferred embodiment, the first valve seat bore is disposed directly opposite to the second valve set bore.

In a preferred embodiment, the solenoid comprises a coil, an armature, a pole core as well as a gap between the pole core and the armature. The pole core comprises a borehole along the longitudinal axis of the valve spindle and provides an accommodation and a linear guidance for the valve spindle. Further preferably, the inventive solenoid valves comprise a control unit for the solenoid. By said control unit, the solenoid can be switched between energized and de-energized.

Further, the invention comprises a hydraulic cartridge solenoid control valve, in particular a hydraulic cartridge 3/2-solenoid control valve, comprising an afore-described hydraulic solenoid valve, wherein the housing is configured to be at least partially inserted into a valve adapter. Said valve adapter is located in a component which integrally accommodates the cartridge 3/2-solenoid control valve. Particularly preferred, the first line, in particular the pressure line, and the second line, in particular the operating line, are directed radially or vertically outwardly with respect to the longitudinal axis of the valve spindle. In addition, O-ring seals are preferably arranged laterally of the outwardly directed first and second lines on the surface of the valve housing, such that these lines can be connected pressure-tight by inserting the cartridge housing. Particularly preferred, the valve housing comprises circumferentially extending ring channels for this purpose. Starting at these ring channels, a plurality of radially directed channels for the first line and/or a plurality of radially directed channels for the second line may preferably lead to the valve chamber.

Further, it is preferred that the hydraulic cartridge solenoid control valve comprises a volume compensation unit including a tank compartment. This volume compensation unit including a tank compartment is integrated into the valve housing or connected to the valve housing by a flange. The tank compartment is preferably connected to the third line. The valve is preferably structured along the longitudinal axis of the valve spindle as follows: The valve chamber including the valve spindle is arranged in the center of the chamber. On one side of the chamber, the volume compensation unit including the tank compartment is integrated or connected by a flange. On the other side of the valve chamber, the solenoid is mounted. Therewith, the hydraulic cartridge solenoid control valve can be inserted into a component with the volume compensation unit to the fore. The solenoid and in particular a plug at the solenoid preferably protrude from the component. In a preferred embodiment, the tank compartment of the volume compensation unit is slightly pressure-loaded by a volume compensation piston and a compensation spring/pressure spring.

BRIEF DESCRIPTION OF THE DRAWINGS

The invention is explained in more detail based on the accompanying drawing, in which.

DETAILED DESCRIPTION OF THE PREFERRED EMBODIMENTS

In the following, an embodiment of the invention is described in more detail with reference to FIGS. 1 to 5.

Figure 2:
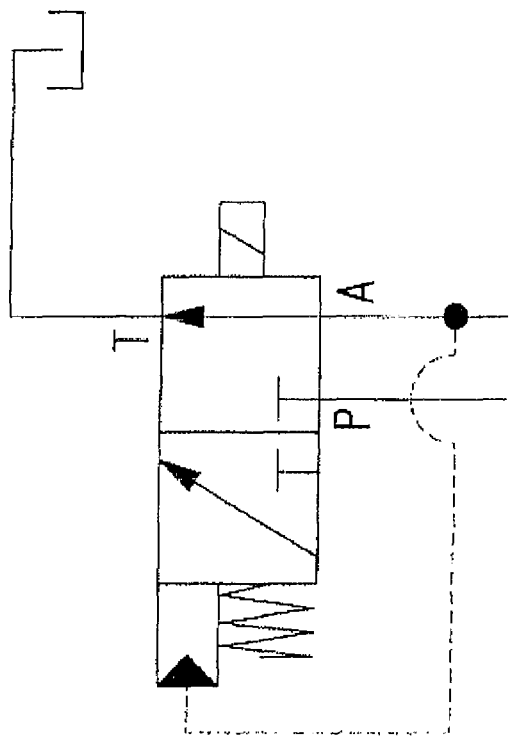
FIG. 2 is the schematic switching symbol for the inventive hydraulic 3/2-solenoid control valve in an energized state.
Figure 1:
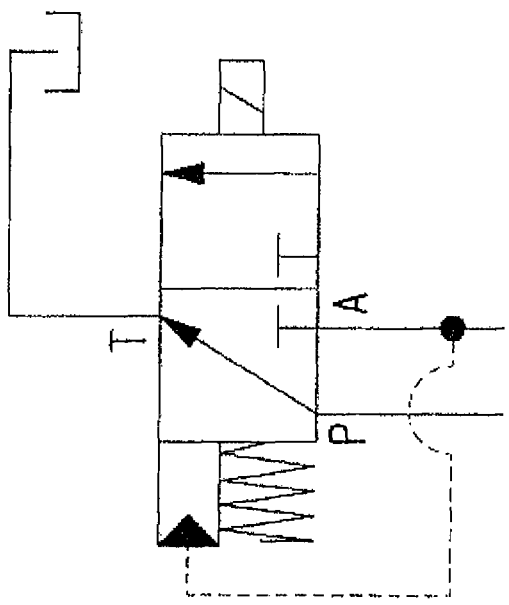
FIG. 1 is a schematic switching symbol for the inventive hydraulic 3/2-solenoid control valve according to one embodiment in a de-energized position.

FIG. 1 shows switching symbol for a hydraulic 3/2-solenoid control valve 1 in a de-energized position. The pressure line P is connected to the tank line T. The operating line A is blocked. FIG. 2 shows the switching symbol of the hydraulic 3/2-solenoid control valve 1 in an energized state. The pressure line P is blocked. The operating line A is connected to the tank line T.

Figure 4:
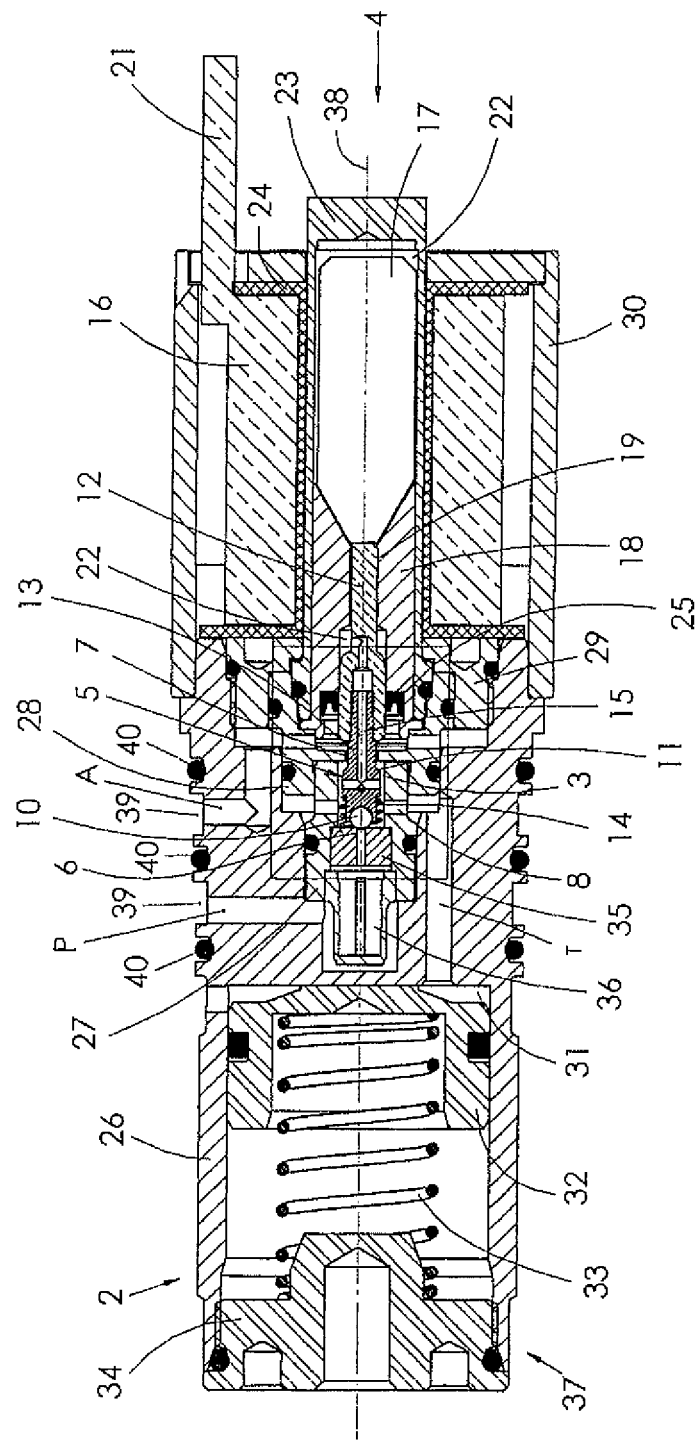
FIG. 4 is the inventive hydraulic 3/2-solenoid control valve in an energized position.
Figure 5:
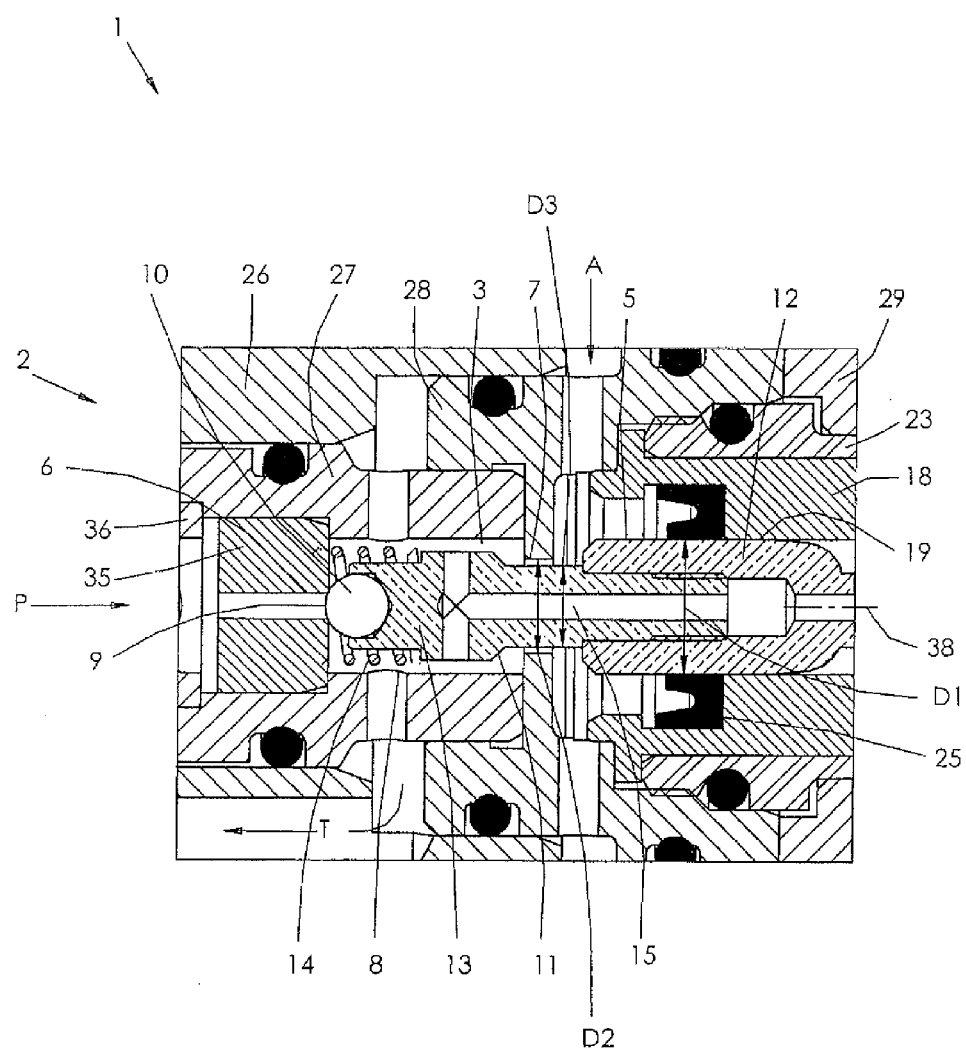
FIG. 5 is a detail of FIG. 4.

In the following, the switching position of FIG. 1 is shown with reference to FIG. 3. FIGS. 4 and 5 show the switching position of FIG. 2.

Figure 3:
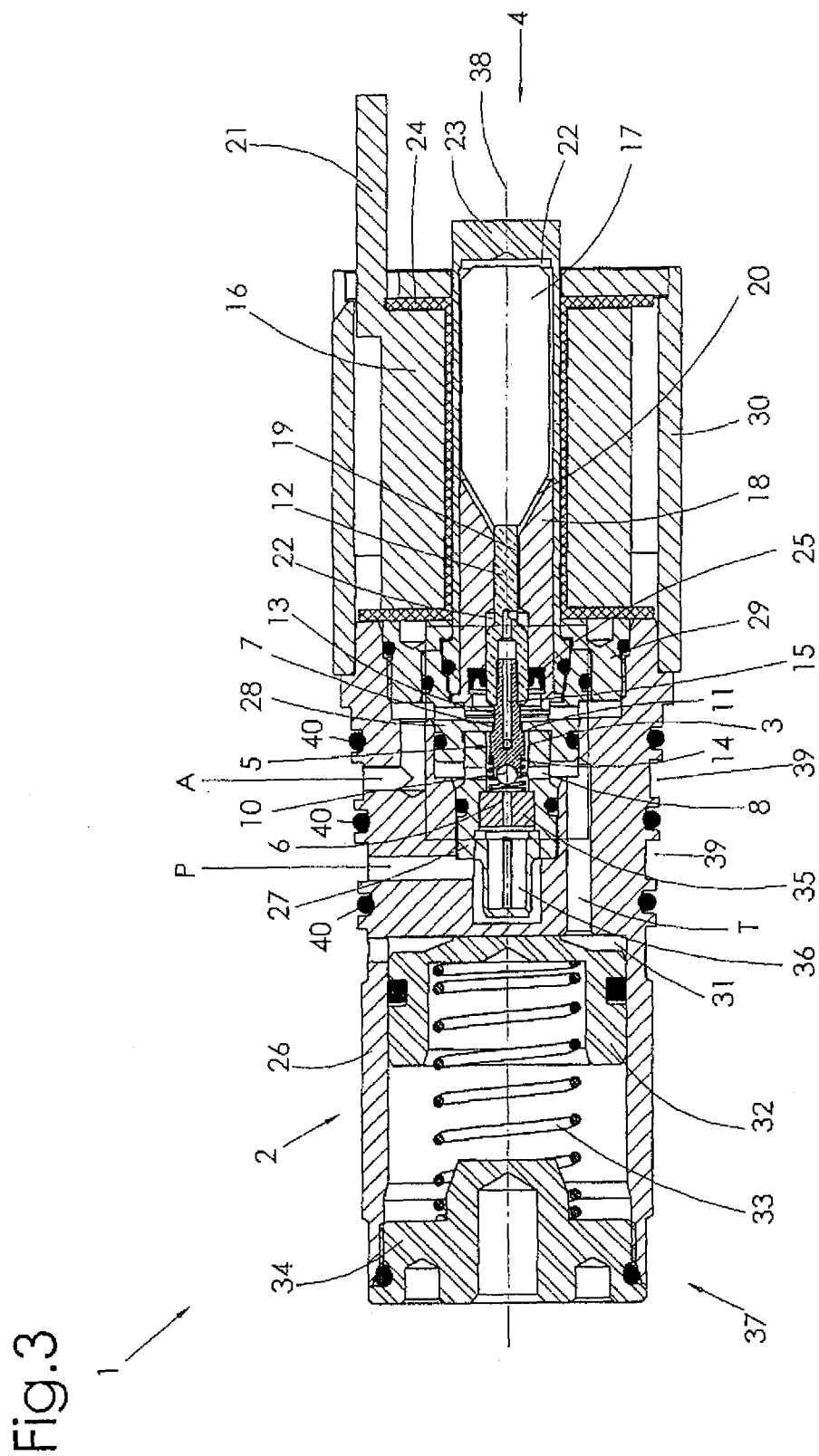
FIG. 3 is the inventive hydraulic 3/2-solenoid control valve in a de-energized position.

FIG. 3 shows a sectional view of the hydraulic 3/2-solenoid control valve in a de-energized state. The hydraulic 3/2-solenoid control valve 1 comprises a housing 2, a valve chamber 3 integrated into the housing 2, a solenoid 4 and a valve spindle 5. The valve spindle 5 moves in a longitudinal direction along a valve axis 38.

The valve chamber 3 comprises a first valve seat bore 6 as a connection from the pressure line P to the valve chamber 3 and a second valve seat bore 7 as a connection from the operating line A to the valve chamber 3. Further, a free aperture 8 to the tank line T is formed at the valve chamber 3. The first valve seat bore 6 is located directly opposite the second valve seat bore 7 in a longitudinal direction. The free aperture 8 is also formed as a borehole, wherein the borehole of the free aperture 8 is arranged vertically (perpendicularly) with respect to the first valve seat bore 6 and the second valve seat bore 7. In addition, a diameter of the first valve seat bore 6 is considerably smaller than a diameter of the second valve seat bore 7.

The valve spindle 5 has a split structure that comprises a first part 12 and a second part 13 being screwed into the first part 12 and thus fixedly connected to the first part 12. The second part 13 extends from the interior of the valve chamber 3 through the second valve seat bore 7 toward the solenoid 4. The first part 12 is disposed completely outside the valve chamber 3.

The second part 13 of the valve spindle 5 comprises a first sealing surface, embodied as a convex surface 9 (see in particular FIG. 5) on a side thereof facing the valve seat bore 6. Said convex surface 9 is formed by a ball 10. The ball 10 is embedded into a face side recess of the valve spindle 5, in particular of the second part 13. In addition, a shoulder is formed at the valve spindle 5, in particular at the second part 13. A valve pressure spring 14 is supported on said shoulder. The convex surface 9 is arranged within said valve pressure spring 14. The valve pressure spring 14 is further supported at the front face of the first valve seat bore 6. Said front face can also be referred to as sealing surface or lateral surface of the first valve seat bore 6. Due to this arrangement of the valve pressure spring 14, the valve spindle 5 is loaded toward the solenoid 4. In a de-energized state, this results in an opening of the first valve seat bore 6.

At the second valve seat bore 7, the valve spindle 5, in particular the second part 13, comprises a second sealing surface, embodied as a cone ring surface 11, within the valve chamber 3. Said cone ring surface 11 is formed about the complete circumference of the valve spindle 5. In a de-energized state of the solenoid 4, said cone ring surface 11 is pushed onto the second valve seat bore 7 and therewith seals the operating line A with respect to the valve chamber 3.

The solenoid 4 comprises a coil 16, an armature 17, and a pole core 18. The coil 16 is wound about the armature 17 and the pole core 18. The armature 17 and the pole core 18 are arranged in series along the longitudinal valve axis 38. In the pole core 18, a borehole is formed along the longitudinal valve axis 38. Said borehole forms a linear guide 19 for at least a portion of the valve spindle 5, in particular a portion of the first part 12 of the valve spindle 5. In an energized state, a gap 20 being as small as possible exists between the pole core 18 and the armature 17. In the de-energized state, said gap 20 is larger. The solenoid 4 further comprises a connecting line or voltage supply 21 for connecting a control unit to the hydraulic 3/2-solenoid valve 1. The armature 17 and the pole core 18 are embedded into a sleeve 23. Further, an insulation 24 exists between the sleeve 23 and the coil 16.

The pole core 18 and the armature 17 are arranged in a so-called armature space 22. Said armature space 22 is located within the sleeve 23. The operating line A is sealed with respect to said armature space 22 by a specific seal, in particular a groove ring seal 25. Said groove ring seal 25 is arranged between the valve spindle 5, in particular the first part 12, and the pole core 18. A connection channel 15 is extending within the valve spindle 5. Said connection channel 15 connects the armature space 22 to the valve chamber 3. Since the valve chamber 3 is always freely connected to the tank line T, also the armature space 22 is always pressureless. The connection channel 15 is formed by a longitudinal borehole along the longitudinal valve axis 38 in the valve spindle 5 as well as by boreholes being vertical with respect to the longitudinal valve axis 38 from the surface of the valve spindle 5 to the longitudinally extending borehole. Due to the split structure of the valve spindle 5, in particular, the longitudinal borehole can be formed along the longitudinal valve axis 38 inside the valve spindle 5.

The housing 2 comprises a base housing component 26, a first valve chamber insert 27 and a second valve chamber insert 28. The first valve chamber insert 27 and the second valve chamber insert 28 together form the valve chamber 3. The hydraulic 3/2-solenoid control valve 1 is structured and assembled as follows: An annular extension 29 is disposed at the solenoid 4. A part of the second valve chamber insert 28 is embedded into said extension 29. The second valve chamber insert 28 in turn accommodates the first valve chamber insert 27. The sleeve 23 of the solenoid 4 extends to the second valve chamber insert 28 and is connected thereto. The complete unit comprises solenoid 4, second valve chamber insert 28 and first valve chamber insert 27 is screwed into the base housing component 26. For this purpose, an internal thread is formed at the base housing component 26, and a corresponding external thread is formed at the extension 29 of the solenoid 4. The individual housing components are sealed against each other.

In addition, the housing 2 comprises a cap 30. The cap 30 encases the solenoid 4 and sits on the base housing component 26.

A drilled insert 35 is formed inside the first valve chamber insert 27. The first valve seat bore 6 is formed in said drilled insert 35. In addition, a filter 36 is arranged in the first valve chamber insert 27. Said filter 36 is disposed outside the valve chamber 3 and in the pressure line P.

In addition, a volume compensation unit 37 including the tank compartment 31 is integrated inside the base housing component 26. Said volume compensation unit 37 including the tank compartment 31 comprises a volume compensation piston 32, a compensation spring/length compensation spring 33 and a bearing 34 for the compensation spring 33. The tank compartment 31 is connected to the tank line T. The volume compensation piston 32 defines a wall of the tank compartment 31. The piston 32 is slightly spring-loaded by the compensation spring 33. The compensation spring 33 is supported against the volume compensation piston 32 on one side thereof and against the spring bearing 34 on the other side thereof. The front face of the spring bearing 34 is screwed into the base housing component 26.

The hydraulic 3/2-solenoid control valve 1 is constructed substantially rotation-symmetrically with respect to the longitudinal valve axis 38. The pressure lines P, the operating lines A and the tank lines T deviate from said symmetry. The pressure line P and the operating line A end at respectively at least one position on the circumferential surface of the base housing component 26. At this position, ring channels 39 are formed. Said ring channels 39 are sealed with O-ring seals 40, when the 3/2-solenoid control valve 1, embodied as a cartridge valve, is inserted into a corresponding receptacle.

FIG. 4 shows the hydraulic 3/2-solenoid control valve 1 according to the embodiment in the energized state. Herein, it is clearly visible that the valve spindle 5 was moved to the left compared to the illustration of FIG. 3. Consequently, the operating line A is directly connected to the valve chamber 3 and thus with the tank line T and the tank compartment 31 via the second valve seat bore 7. The pressure line P is blocked by the seating of the ball 10 in the first valve seat bore 6 and is therefore not connected to the valve chamber 3.

FIG. 5 shows a detail of FIG. 4. Based on this illustration, particularly the differential-area-ratio can be explained. It shall be noted that said differential-area-ratio is used upon a closed second valve seat bore 7 and thus in the de-energized valve position shown in FIGS. 1 and 3. As shown in FIG. 5, the valve spindle 5 comprises a sealing diameter D1 at the groove ring seal 25. The second valve seat bore 7 has an inner diameter D2. In a region between the groove ring seal 25 and the second valve seat bore 7, the valve spindle 5 has a smallest diameter D3. When the second valve seat bore 7 is closed, the pressure in the operating line A acts on the following surfaces of the valve spindle 5: The first surface is calculated by $(D2^2/4*\pi)-(D3^2/4*\pi)$. The second surface is calculated by $(D1^2/4*\pi)-(D3^2/4*\pi)$. Due to the fact that the first surface is smaller than the second surface, the operating pressure acts to the right in the shown illustration, when the second valve seat bore 7 is closed. Therewith, the valve pressure spring 14 is supported and the cone surface 11 is pulled into the second valve seat bore 7.

Based on the shown embodiment, it was explained how a hydraulic 3/2-solenoid control valve 1, in particular with a cartridge design, can be formed for an operation free of leakage oil. In the de-energized switching position, shown in FIG. 3, the side of the valve spindle 5 formed as the cone surface 11 is pushed into the second valve seat bore 7 of the operating line by the pressure spring 14 and therewith blocks the connection of said line with respect to the tank in an oil-tight manner. On the magnet side, the valve spindle 5 is radially formed with a groove ring seal 25 with respect to the armature space 22. The sealing diameter D1 of the valve spindle 5 toward the armature space 22 is larger than the second valve seat bore 7. Therewith, there results a defined area ratio between the cone seat and the sealing diameter D1 of the armature space 22. If the operating line A is pressurized, a differential force is generated through the area ratio between the operating line and the sealed armature space 22, which force pulls the valve spindle 5 toward the solenoid 4 and acts in addition to the elastic force against the second valve seat bore 7. The sealing effect increases with increasing pressure in the operating line A. The solenoid 4 is preferably configured such that a switching against the elastic force plus differential force is prevented. In this position, the pressure line P and the tank line T are connected to each other.

In the energized switching position according to FIG. 4, the operating line A is pressureless, wherein the valve spindle 5 seals, with its ball 10, the pressure line P in an oil-tight manner against the elastic force. A consumer connected through the pressure line P, can now be effectively sealed until the rated operating pressure is reached. Said operating pressure is dependent on the magnetic force. In this switching position, the operating line A is connected to the tank line T without pressure. Therewith, no pressure or only a small dynamic pressure can build up in the operating line A.

The embodiments of the proposed 3/2-solenoid control valve are applicable according to embodiments of the invention also for other valve designs, independent from the cartridge design and independent of the number of lines and/or switching positions. In particular a combination of ball seat and cone seat in a valve, in particular on a valve spindle, and/or the differential-area-ratio are applicable for other valves according to the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hydraulic 3/2-solenoid control valve, comprising:
a valve housing;
a valve chamber integrated into the valve housing, the valve chamber including a first valve seat bore configured as a connection to a first line, a second valve seat bore as a connection to a second line, and a free aperture to a third line,
a solenoid; and
a valve spindle configured to be moved by the solenoid and at least partially arranged in the valve chamber, the valve spindle comprises,
a first sealing surface having a first surface area arranged within the valve chamber facing the first valve seat bore; and
a second sealing surface having a second surface area that is greater than the first surface area and arranged facing the second valve seat bore,
wherein one of the first valve seat bore and the second valve seat bore can be closed the first sealing surface and the second sealing surface respectively;
wherein the valve spindle protrudes from the valve chamber through the second valve seat bore toward the solenoid,
wherein, when the second valve seat bore is closed, the valve spindle is pulled into the second valve seat bore by a differential-area-ratio through a pressure in the second line, and
wherein a sealing diameter of the valve spindle outside the valve chamber is larger than a diameter of the second valve seat bore, such that the differential-area-ratio is generated, and
wherein the sealing diameter is defined at a seal between the valve spindle and the solenoid.

2. The hydraulic 3/2-solenoid control valve of claim 1, wherein a pressure spring is arranged between the first valve seat bore and the valve spindle.

3. The hydraulic 3/2-solenoid control valve of claim 1, wherein the second sealing surface is configured to seal the second valve seat bore in a de-energized state of the solenoid, and that the first sealing surface is configured to seal the first valve seat bore in an energized state of the solenoid.

4. The hydraulic 3/2-solenoid control valve of claim 3, wherein the first sealing surface comprises a convex surface.

5. The hydraulic 3/2-solenoid control valve of claim 1, wherein the second sealing surface comprises a cone surface, in particular a cone ring surface.

6. The hydraulic 3/2-solenoid control valve of claim 1, wherein the valve spindle comprises a first part guided to be linearly movable in the solenoid and a second part that is screwed into the first part.

7. The hydraulic 3/2-solenoid control valve of claim 1, wherein the seal is arranged between the valve spindle and an armature space of the solenoid,
wherein the armature space is freely connected to the third line via a connection channel extending through the valve spindle.

8. The hydraulic 3/2-solenoid control valve according to claim 1, wherein the valve housing is configured to be at least partially inserted into a valve adapter.

9. The hydraulic 3/2-solenoid control valve of claim 8, further comprising a volume compensation unit including a tank compartment, wherein the volume compensation unit including the tank compartment is one of integrated into the valve housing and connected to the valve housing by a flange.

10. The hydraulic 3/2-solenoid control valve of claim 1, wherein the first line is a pressure line.

11. The hydraulic 3/2-solenoid control valve of claim 1, wherein the second line is an operating line.

12. The hydraulic 3/2-solenoid control valve of claim 1, wherein the third line is a tank line.

13. The hydraulic 3/2-solenoid control valve of claim 4, wherein the convex surface is a ball.

14. The hydraulic 3/2-solenoid control valve of claim 5, wherein the cone surface is a cone ring surface.

15. The hydraulic 3/2-solenoid control valve of claim 7 wherein the seal is a groove ring seal.

16. The hydraulic 3/2-solenoid control valve of claim 1 wherein
the first surface is calculated by:

$(D2^2/4*\pi)-(D3^2/4\pi)$ and the second surface is calculated by:

$(D1^2/4*\pi)-(D3^2/4*\pi)$, wherein:
D1 is the sealing diameter D1 at the seal,
D2 is an inner diameter of the second valve seat bore 7, and
D3 is a smallest diameter of the valve spindle between the seal and the second valve seat bore.

* * * * *